Nov. 2, 1965          K. GELPEY          3,215,761
METHOD AND APPARATUS FOR END SEALING PRESSURIZED CABLE
Filed Dec. 11, 1962                    2 Sheets-Sheet 1

INVENTOR.
KENNETH GELPEY
BY
ATTORNEYS

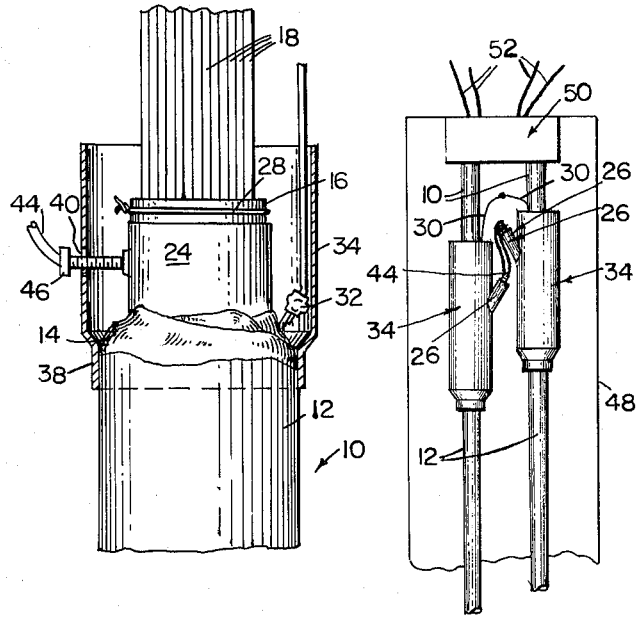
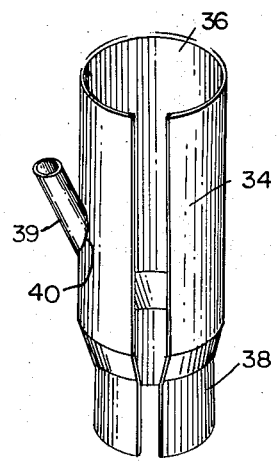
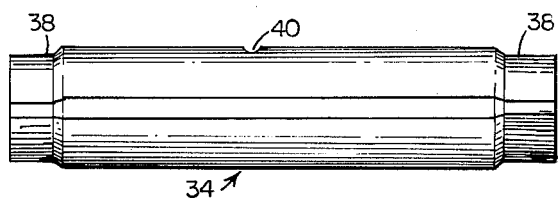
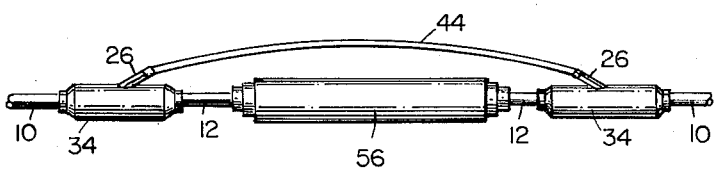

United States Patent Office 3,215,761
Patented Nov. 2, 1965

3,215,761
METHOD AND APPARATUS FOR END SEALING PRESSURIZED CABLE
Kenneth Gelpey, Medford, Mass., assignor to Traffic Control Inc., Medford, Mass., a corporation of Massachusetts
Filed Dec. 11, 1962, Ser. No. 243,829
3 Claims. (Cl. 264—139)

This invention relates generally to pressurized, sheathed transmission cables and more particularly to a method and means for sealing an end thereof and providing a connection for the transmission of the pressurized gas from one cable to another.

Pressurization of gas-filled transmission lines is utilized to provide protection for the system against air leakage, moisture and water vapor. The pressurization and sealing of the system protects against consequent damage by the elements and inhibits power loss and voltage breakdown caused by the corrosion of the metallic elements, the growth of fungi and the shorting action of moisture.

Glass, rubber and ceramic materials have been used in the past to provide end seals; however, none of these devices are capable of field installation at the situs of the transmission line. In addition, the utilization of a large number of wires in a sheath, as is conventional with telephone lines, prohibits the use of previously suggested end seals which rely on the rigid characteristics of waveguides.

Various types of end seals used in the past and presently in use now involve the use of probes which extend out of the top of the mold and there is always the danger of injuring the insulation on the conductors thereby shorting out the cables. Also since it is essential that the area where the splice is effected to keep free from the sealing compound to prevent blocking of the gas and that the heretofore known end seals maintain an initial air pressure on the lower surface of the sealing compound resulting in bubble forming in the compound reducing the gas tight integrity of the seal.

This invention overcomes the field installation problems of the aforementioned arrangement and has particular utility with buried, water immersed, sheathed telephone power cables. These cables are brought above ground or water in order to make splice connections to points of distribution and are required to be sealed and provided with a bypass for pressurized gas across the splice. The utilization of a removable bypass unit facilitates the checking of pressure at each splice to detect leaks in the cable.

Accordingly, it is an object of this invention to provide a novel method and arrangement for sealing a pressurized transmission line.

It is another object of this invention to provide a novel method for producing a transmission line seal and a novel transmission line seal having an arrangement for transferring the pressure from one line to another.

It is another object still of this invention to provide a novel transmission line seal and method therefor which is capable of manufacture and performance under field conditions.

It is another object of this invention to provide a universal mold adapted for use with varying diameters of cable to retain a di-electric in position.

It is a further object of this invention to provide a potting method and mold for sealing a transmission line with provision for a bypass line to another transmission line.

Other objects of this invention will, in part, be obvious and will, in part, appear hereinafter.

Broadly stated the feature of this invention is to provide an apparatus and method for sealing the ends of gas filled transmission lines when it becomes necessary to splice a connector therein or wherein repairs have to be effected to damaged sections.

Since the transmission lines are of various sizes, a feature of this invention is to provide universal sizes of end seal molds to accommodate cable from the minimum size in use up to and including cables three inches and greater in size. In the provision of end seal molds of a universal nature care must be taken to provide the optimum clearance of one-half inch between the exterior of the cable and the interior of the mold to prevent excessive accumulation of the potting compound which is of a thermoplastic or thermosetting nature and has a chemical or exothermic reaction. In the event that large amounts of the potting compound were used there is danger that the exothermic reaction will adversely affect the insulation on the conductors.

To the accomplishment of this and the foregoing related ends, the present invention then consists of the means hereinafter fully described and particularly pointed out in the claims, the annexed drawing and the following description setting forth in detail certain means in the carrying out of the invention such disclosed means illustrating, however, but one of the various ways in which the principle of the invention may be employed.

In the drawings:

FIG. 5 is a view in front elevation of a mold utilized with vertical cables positioned around the cable by-pass unit;

FIG. 6 is a view in front elevation of a mold utilized with vertical cables;

FIG. 7 is a view in front elevation of a mold utilized with horizontal cables;

FIG. 8 is a view in front elevation of a pedestal containing cables passing through a terminal box; and FIG. 9 is a view of an access jacket utilized in elevated lines.

Figure 1:
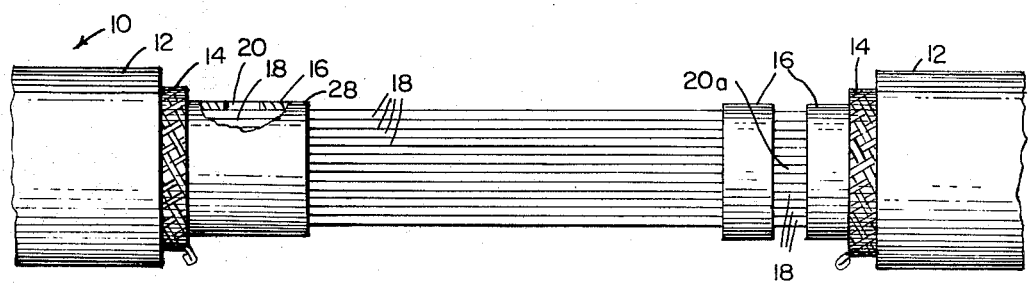
FIG. 1 is a view in front elevation of a cable partially prepared in accordance with the method of this invention.

Referring to FIG. 1, there is shown a conventional telephone cable 10 suitable for underground or underwater use. Basically the cable comprises a waterproof outer jacket 12 which encloses a metal sheath 14, which in turn encompasses a plastic inner jacket 16 through which pass a number of insulated conductors 18. Pressurization of the cable with a gas is achieved in a conventional manner well known in the art and utilized for the more effective transmission of high frequency electrical power.

However, in order to provide for a splicing of two cables or a splice to enable distribution from the cable to remote points, provision must be made for disrupting the integrity of the protective coverings to provide access to the conductors within. The disrupted portion of the cable must be provided with a seal to inhibit excessive gas leakage and, additionally, a jumper or by-pass to conduct pressurized gas across the splice must be supplied.

Assuming the portion of the cable 10 to which a splice is to be made has been raised from the water or exposed from its underground location to provide access thereto, a portion of the outer jacket 12 is then removed for length along the cable 10 wherein the splice is to be made, as illustrated on the left side of FIG. 1. The metal sheath 14 is next removed for almost the same length except that a small section is left exposed if a ground connection between the ends of the severed sheath and to any other cables meeting at the distribution junction on binding posts of a junction box (not shown) is desired.

The now exposed inner plastic jacket 16 is next removed with any other wrapping that may be used for a lesser distance than the outer jacket in order to allow for the installation of a bypass unit for a purpose to be described more fully hereinafter. A window 20 is then cut in the inner jacket 16 providing a gas passage into the interior of the cable, care being taken not to disturb the insulation on the conductors 18.

An alternative method for the operation on the jacket 16 is illustrated on the right side of FIG. 1, wherein a portion of the inner jacket 16 is removed as shown at 20a to provide the equivalent of the window 20 of the left hand portion of FIG. 1.

Figure 2:
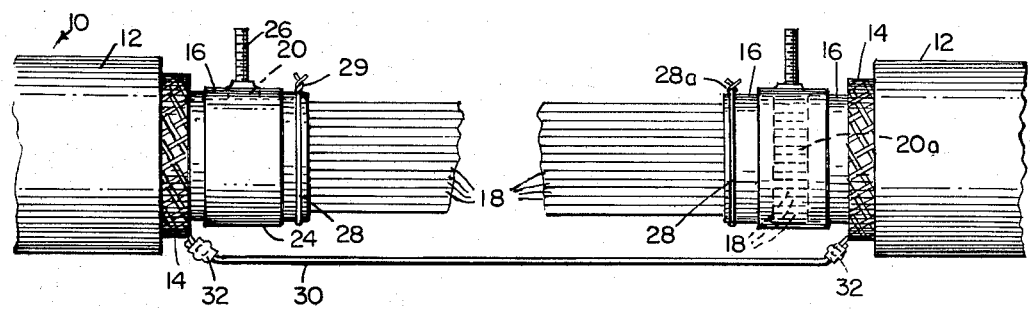
FIG. 2 is a view in front elevation of the cable with a bypass unit in place.
Figure 3:
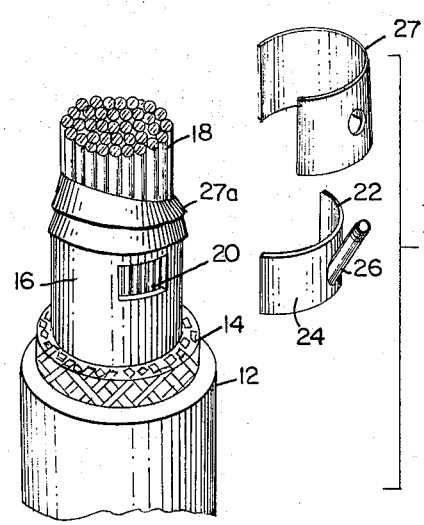
FIG. 3 is an exploded view of a cable prior to installation of a by-pass unit used in the sealing process.

The cable is now ready for the installation of the bypass unit 22 shown in its proper position in FIG. 2. The bypass unit 22 comprises a saddle portion 24 having sufficient flexibility to conform to the exterior surface of the inner plastic jacket 16 and a pneumatic valve and stem 26 extending angularly therefrom.

Figure 4:
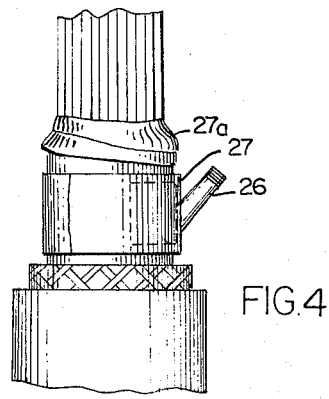
FIG. 4 is a view in front elevation of the cable with by-pass unit in place.

A wide strip of conventional electrical tape 27 and or double faced pressure sensitive type tape on the back surface of the saddle secures the by-pass unit to the exterior of the inner plastic jacket 16 as shown in FIG. 4 so that the stem 26 is in alignment with the window 20. The case end of the valve 26 is positioned away from the saddle and is threaded to provide means for connecting a jumper.

In assembling the unit with the cable, the by-pass unit 22 is placed over the exposed inner jacket 16 so that the pneumatic valve 26 overlies the window 20 so that there is an unobstructed passageway thru the valve to the interior of the cable. The by-pass unit is then secured to the inner jacket by means of the tape 27 thereby sealing all edges of the assembly with the flexible saddle portion closely conforming to the shape of the jacket 16.

A sealing compound (not shown) is poured between the conductors 18 near the end 28 of the inner jacket 16 and strips of tape 27a are tightly wrapped around the exposed conductors 18 and the end of the cable to compress the compound and effect an inner seal. Alternatively one or more tourniquets 29 may be twisted around the exposed end of the inner jacket 16 to promote a seal or aid the sealing medium at 28.

If desired, a ground wire 30 is then clamped by means of a crimped connector 32 to the metal sheath 14 to maintain the electrical continuity of the sheath.

As shown in FIG. 5, tape is secured at the junction of the cable 12 and the metal sheath 14 and between the sheath 14 and the inner plastic covering 16.

The assembly is now ready for sealing or potting and an adjustable mold 34, FIGS. 6 and 7, is placed around the cable 10 with the pneumatic valve unit 26 extending therethrough as shown in FIG. 5. A mixture of a conventional potting compound such as a catalyst and resin is prepared and cast in the mold, thereby providing an end seal for the cable 10.

As shown in FIG. 6, the mold 34 comprises a preformed curved sheet 36 of flexible material such as plastic having an inwardly stepped portion 38 at one end. The sheet 36 is rolled to form a cylinder around the cable after the valve unit 26 has been inserted in the body portion of the sheet having a preformed hole 40. It will be seen by referring to FIG. 5 that after forming the cylinder two different diameters result, one to conform to the diameter of the cable 12, the other relatively larger to provide a space between the stripped portion of the cable and the interior of the mold. The edges of the sheet may be held in place by means of double faced pressure sensitive tape while the seams and joints are taped. The mold unit shown in this figure, is utilized when the cable 10 may be vertically oriented so that the resin may be placed in the open end and settle by gravity and allowed to cure. The adjustable mold provides a barrel diameter for individual cable sizes corresponding to the cable diameter which limits the volume of resin used, thereby avoiding damage to the insulation on conductors 18 caused by excessive heat of the curing of large volumes of resin. As shown in FIG. 6 a boss 39 may be provided on the exterior surface of the mold 34 defining a concentric barrel to permit a more effective seal for the pneumatic valve unit 26.

The mold of FIG. 7 is provided for horizontally oriented cables and differs from that shown in FIG. 6 in that both ends of the mold are stepped as at 38 and filling holes may be provided in the body portion.

An example of a complete end seal with the bypass in position as shown in FIG. 5 requires the installation of a tube 44 of rubber, plastic or metal, having female connectors 46 at both ends with the connectors being of the screw type used on conventional tire pumps. Attachment of the connectors 46 to pneumatic valve units 26 provides a bypass for the pressurized gas across the pressure sealed portion of the cable where the splice is taking place to the opposite end of the cable.

In FIG. 8 a typical ground or subterranean installation is shown having a pedestal 48 containing a terminal or distribution box 50 with leads 52 extending outwardly to subsidiary lines (not shown).

In FIG. 9 there is illustrated a typical installation in use in the field where blocked end portions are connected on either side of an easy access jacket 56 with the gases bypassed through the jumper tube 44.

Some cables are provided with additional wrappings, which, in accordance with the practice of this method, would be removed to allow for the passage of the gas through the valve units 26 to the interior of the cable.

It should be noted that the size of the bypass unit 22 does not create a large pressure drop such as would occur with the use of a hypodermic type needle for tapping into the center of the cable. In addition smoke from a cigarette or cigar may be blown into the valve unit in order to test the taped assembly for leaks prior to the application of the molds.

Molds of the universal wrap around type shown in FIGS. 6 and 7 also find application in repairing or splicing sections of pressurized cable where the gas flow is not bypassed, and in conventional splices of unpressurized cables or wires.

I claim:

1. A method of sealing the ends of a multi-layered pressurized cable in the field comprising the steps of:
    (a) removing several layers of cable covering adjacent the end thereof;
    (b) forming an opening through the remaining layers into the interior of the cable whereby damage to the insulation on the conductors is avoided;
    (c) mounting a bypass device on said stripped portion of the cable, said bypass having valved tube means extending therefrom and in alignment with said opening whereby a continuous flow of gas is maintained into the interior of the cable;
    (d) wrapping a flexible overlapping mold around the stripped portion of said cable; and
    (e) filling said mold with a potting compound and allowing said potting compound to cure.

2. An apparatus for conveying pressurized gas within a cable across a splice thereof, said apparatus including a bypass unit comprising a flexible saddle-shaped base whereby said base conforms to the exterior surface of an inner plastic jacket of said cable, a pneumatic tube threaded valve means attached to said base and extending angularly from the medial lateral surface thereof, and a flexible overlapping mold encompassing the ends of said splice in overlapping relationship whereby means adapted for curing within said mold to preserve the gas integrity thereof may be contained.

3. A universal flexible mold for use in preparing end seals of various sized pressurized cables in field installations, said mold including a curvilinear flexible body portion having overlapping edge portions, said body portion having a plurality of stepped portions of decreasing diameters defining ends of said mold, means formed through one lateral surface of said body portion whereby tube means extending angularly from said cables are concentrically engaged, and means located in said body portion for inserting a potting compound within said mold.

References Cited by the Examiner

UNITED STATES PATENTS

| 943,558 | 12/09 | Milam. | |
|---|---|---|---|
| 1,845,629 | 2/32 | Saylor | 174—22 |
| 2,261,742 | 11/41 | Matsumoto | 174—21 |
| 2,877,288 | 3/59 | Bollmeier | 174—76 |
| 3,150,221 | 9/64 | Bollmeier | 264—278 |

OTHER REFERENCES

German Auslegeschrift, 1,059,527, published June 18, 1959.

J. SPENCER OVERHOLSER, *Primary Examiner.*

ALEXANDER H. BRODMERKEL, MARCUS U. LYONS, *Examiners.*